Oct. 16, 1956        G. E. KAUFMAN        2,766,972

FOOD MIXER

Filed Feb. 8, 1954

United States Patent Office 2,766,972
Patented Oct. 16, 1956

2,766,972
FOOD MIXER

George E. Kaufman, Canton, Ohio, assignor to The Hoover Company, North Canton, Ohio, a corporation of Ohio Application February 8, 1954, Serial No. 408,871

4 Claims. (Cl. 259—51)

The present invention relates to food mixers and more particularly to a double bowl or pan arrangement in which the mixer unit is pivotally supported on the outer bowl or pan on a vertical axis. The inner bowl is rotatably mounted within the outer bowl or pan and the mixer unit is mounted in such a manner that the mixers may be manually moved to adjacent one side of the inner bowl whereby the reaction between the mixers and the material being mixed rotates the inner bowl within the outer bowl or pan.

The inner bowl is provided with an outwardly extending flange which extends over the rim or edge of the outer bowl or pan. The inner bowl is rotatably mounted on a bearing centrally of both bowls. A roller is mounted on the rim of the outer bowl or pan at a point adjacent where the mixers are positioned when in operative position to prevent the inner bowl from tilting and to thus assure that the inner bowl will be rotated within the outer bowl or pan.

The power unit is also so made that it may be removed from the double bowl arrangement and used as a handheld power mixer.

The mixer unit is so made that it may be independently supported on its rear end by means of the carrying handle and the rear end of the motor casing.

According to the invention the outer bowl or pan may be partially filled with water and the mixer used on the stove while the water in the outer bowl is being heated similar to the well-known double boiler arrangement. The outer bowl may contain cracked ice or chilled water at times when the material being mixed needs chilling.

Figure 2:
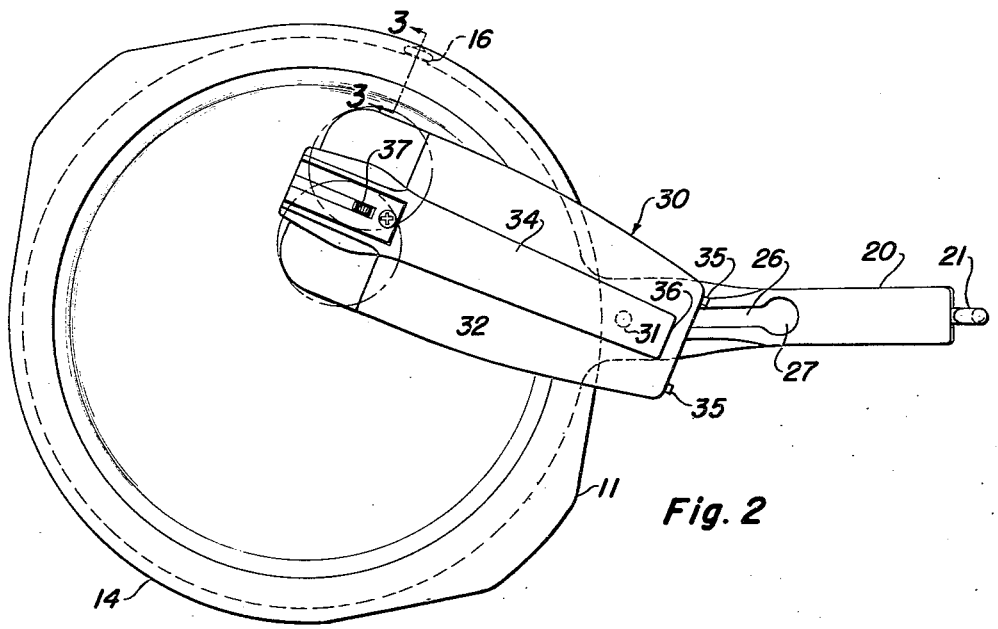
Figures 1, 3:
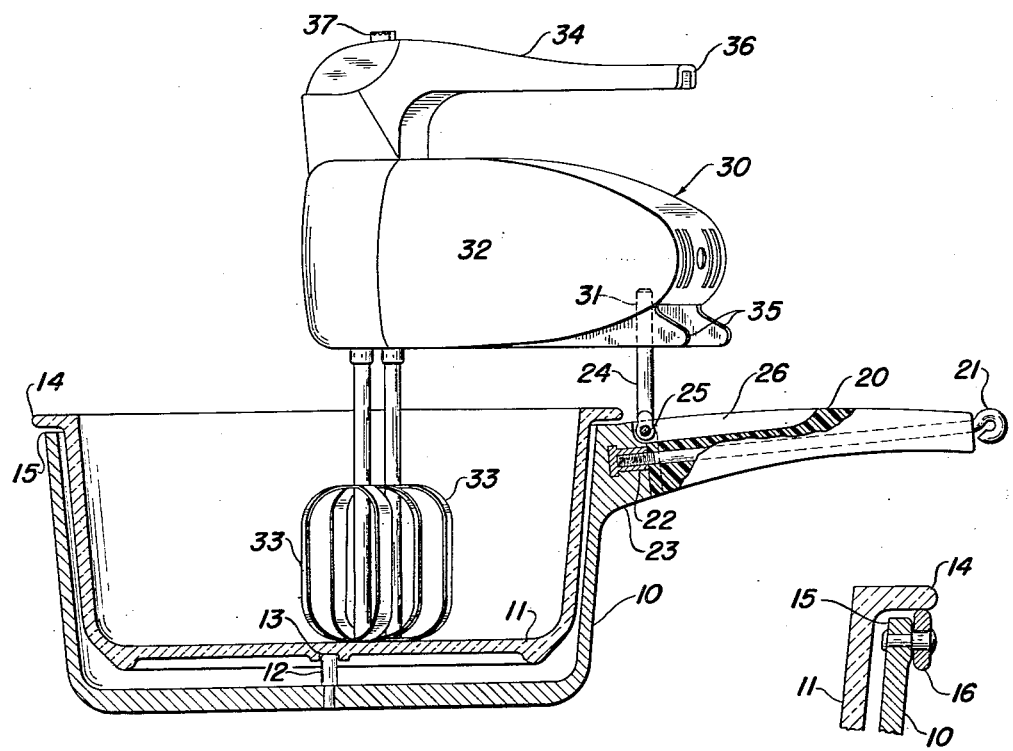

Other objects and advantages of the present invention will become apparent as the description proceeds when taken in connection with the accompanying drawings in which Fig. 1 is a vertical cross sectional view of the mixer of the present invention;

Fig. 2 is a plan view looking downwardly on the mixer of the present invention in operative position; and Fig. 3 is a segmental sectional view taken on the line 3—3 of Fig. 2.

Referring to the drawings, the reference numeral 10 represents the outer bowl or pan within which the inner bowl 11 is rotatably mounted. The outer bowl or pan 10 is preferably made of cast aluminum and is provided centrally of its bottom with an upstanding pin 12 which coacts with a recess 13 in the bottom of the inner bowl 11 to rotatably mount the inner bowl 11 for rotation on a vertical axis within the outer bowl or pan 10.

The inner bowl 11 is provided with an outwardly extending annular flange 14 which overlies the rim 15 of the outer bowl or pan 10. A roller 16 is rotatably mounted on the rim 15 of the outer bowl and is positioned to engage the under side of the flange 14 of the inner bowl as shown in Fig. 3.

The outer bowl or pan 10 is provided with a heat resistant handle 20 secured to the pan 10 by an eye-bolt 21 screwed into a nut embedded in a projection 23 of the pan 10. A supporting arm 24 is pivoted at 25 to the projection 23 and is adapted to be folded downwardly into a recess 26 formed in the upper side of the handle 20. The recess 26 is enlarged as shown at 27, Fig. 2, so that the support 24 may be easily grasped when it is desired to pivot it upwardly into supporting position.

A mixer unit generally indicated by the reference numeral 30 is constructed to be mounted on the support 24 by means of a socket 31 formed in the bottom of the rear end of the casing 32, which houses a motor and gearing which drives the mixers 33.

A carrying handle 34 is attached to the forward end of the casing 32 and extends rearwardly above the top thereof whereby the power unit may be lifted from the support 24 and used independently of the bowls 10 and 11. The casing 32 is provided with a rearward extension 35 which cooperates with the rear end 36 of the handle 34 whereby the power unit may be supported on its rear end when not in use. A suitable switch 37 may be provided for controlling the energization of the power unit 30, a suitable electric cord being connected in circuit for that purpose.

Operation

If the mixer is to be used as in a double boiler arrangement, water is placed in the pan 10 and the pan 10 placed on a stove or other heater for heating the water. The device may also be used as an ordinary mixer, in which case no water is placed in the outer pan 10. If the material being mixed requires chilling, crushed ice or chilled water is placed in the outer pan 10.

The bowl 11 is then placed inside the pan 10 with the depression 13 in engagement with the spindle 12 and with the flange 14 in engagement with the roller 16. The support 24 is then pivoted upwardly out of the recess 26 to the position shown in Fig. 1. The material to be mixed is then placed in the bowl 11 and the power unit 30 placed in the position shown in Fig. 1 with the socket 31 in engagement with the upper end of the support 24 and the switch 37 operated to energize the power unit.

The power unit 30 is manually moved to one side about the support 24 to the position shown in Fig. 2 with the mixers 33 adjacent the side wall of the bowl 11 opposite the point where the roller 16 is supported.

The reaction of the mixers 33 with the material being mixed and with the side of the bowl 11 will cause the bowl 11 to rotate within the pan 10 about the spindle 12, the roller 16 preventing the bowl 11 from tilting due to the reactive force tending to rotate the bowl.

If it is necessary that the material being mixed be heated during the mixing operation, water is placed in the pan 10 as previously described about the bowl 11 and the entire assembly placed on a stove, or other heater, to apply heat to the material being mixed. If chilling is necessary, crushed ice or chilled water is placed in the pan 10. If no heat or chilling is required, the pan 10 is left empty and the mixer used as above described.

When the mixing operation is completed, the mixer unit 30 is removed from the support 24 and supported on its rear end on the projection 35 and the rear end 36 of the handle 34.

It is obvious that the mixer unit 30 may be grasped by the handle 34 and used as a hand-held power mixer independently of the bowls 10 and 11.

From the foregoing it can be seen that the present invention provides a mixer having an inner bowl rotatably mounted within an outer pan with provisions for mounting a mixer unit thereon in which the reaction between the mixers and the material being mixed automatically moves the mixers to one side of the inner bowl and the reaction of the mixers with the material also causes the inner bowl to be rotated within the outer pan, the arrangement being such that the inner bowl cannot tilt relative to the pan during rotation thereof.

While I have shown and described but a single embodiment of my invention, it is to be understood that that embodiment is to be taken as illustrative only and not in a limiting sense. I do not wish to be limited to the particular structure shown and described but wish to include all variations thereof except as limited by the scope of the claims.

I claim:

1. In combination, an outer receptacle, bearing means mounted centrally within said outer receptacle, an inner bowl rotatably mounted on said bearing means so as to be free to rotate on a vertical axis within said outer receptacle, a vertical axis pivot mounted on said outer receptacle adjacent the edge thereof, a power unit mounted on said vertical axis pivot so as to extend inwardly over said inner bowl and free to swing sideward about said vertical axis pivot, rotatable mixers extending downwardly into said inner bowl from the free end of said power unit, the arrangement being such that upon operation of said power unit the reaction between said mixers and material being mixed will first pivot said power unit about said vertical axis pivot so as to move said mixer to adjacent a side wall of said inner bowl and thereafter the reaction between the mixers and the material being mixed and between the material being mixed and the side wall of said inner bowl will cause said inner bowl to rotate about a vertical axis on said bearing means.

2. The combination set forth in claim 1 in which said inner bowl is provided with a flange extending over the edge of said outer receptacle and said outer receptacle is provided with a roller in engagement with said flange to prevent tilting of said inner bowl during rotation thereof within said outer receptacle.

3. The combination as set forth in claim 2 in which said roller is positioned adjacent the point on the periphery of said inner bowl to which said mixers are moved by the reaction thereof with the material being mixed.

4. The combination as set forth in claim 1 in which a handle is secured to said outer receptacle adjacent said vertical axis pivot and said vertical axis pivot is foldable downwardly into a recess in said handle.

References Cited in the file of this patent

UNITED STATES PATENTS

| | | |
|---|---|---|
| 1,295,684 | Bouquin | Feb. 25, 1919 |
| 2,376,722 | Podell | May 22, 1945 |
| 2,534,683 | Schmidt et al. | Dec. 19, 1950 |
| 2,566,651 | Bemis | Sept. 4, 1951 |